(12) United States Patent
Tapia (10) Patent No.: US 9,643,287 B2
(45) Date of Patent: May 9, 2017

(54) METHOD AND PRODUCTION FACILITY FOR MANUFACTURING A WIND TURBINE BLADE

(71) Applicant: Vestas Wind Systems A/S, Aarhus N. (DK)

(72) Inventor: Raul Garcia Tapia, Southampton Hampshire (GB)

(73) Assignee: Vestas Wind Systems A/S, Aarhus N (DK)

( * ) Notice: Subject to any disclaimer, the term of this patent is extended or adjusted under 35 U.S.C. 154(b) by 424 days.

(21) Appl. No.: 14/356,052

(22) PCT Filed: Oct. 31, 2012

(86) PCT No.: PCT/DK2012/050399
§ 371 (c)(1),
(2) Date: May 2, 2014

(87) PCT Pub. No.: WO2013/064152
PCT Pub. Date: May 10, 2013

(65) Prior Publication Data
US 2014/0322023 A1    Oct. 30, 2014

Related U.S. Application Data

(60) Provisional application No. 61/554,512, filed on Nov. 2, 2011.

(30) Foreign Application Priority Data

Nov. 2, 2011 (DK) .................................. 2011 70600

(51) Int. Cl.
*B23P 15/04* (2006.01)
*B29C 70/38* (2006.01)
(Continued)

(52) U.S. Cl.
CPC .............. *B23P 15/04* (2013.01); *B29C 70/38* (2013.01); *B29D 99/0028* (2013.01);
(Continued)

(58) Field of Classification Search
CPC ..... B23P 15/04; B29C 70/38; B29D 99/0028; F03D 1/0675; Y02E 10/721; Y10T 29/49337; Y10T 29/53961
(Continued)

(56) References Cited

U.S. PATENT DOCUMENTS 8,617,338 B2 * 12/2013 Borsting ................. B29C 70/38
156/166

FOREIGN PATENT DOCUMENTS

DK   WO 2010100250 A2 *   9/2010 ............. B29C 70/38
EP   2226186 A1    9/2010
(Continued)

OTHER PUBLICATIONS

International Searching Authority, International Search Report issued in corresponding PCT Application No. PCT/DK2012/050399 dated Jan. 14, 2013, 10 pages.
(Continued)

*Primary Examiner* — William McCalister
(74) *Attorney, Agent, or Firm* — Wood Herron & Evans LLP (57) ABSTRACT

The present invention relates to a method for manufacturing a wind turbine blade in a production facility. The method comprises the steps of positioning a first overhung gantry to extend transversely over an elongated first mold part for manufacturing one of a first part and a second part of the blade, performing a first working action at the first mold part with a first tool mounted on the first overhung gantry, moving the first overhung gantry from the first mold part to an elongated second mold part for manufacturing the other
(Continued)

of the first and the second part of the blade, positioning the first overhung gantry to extend transversely over the second mold part, and performing a second working action at the second mold part by means of the first tool or a second tool mounted on the first overhung gantry.

15 Claims, 11 Drawing Sheets (51) Int. Cl.
*B29D 99/00* (2010.01)
*F03D 1/06* (2006.01)
(52) U.S. Cl.
CPC .......... *F03D 1/0675* (2013.01); *Y02E 10/721* (2013.01); *Y10T 29/49337* (2015.01); *Y10T 29/53961* (2015.01)

(58) Field of Classification Search
USPC .................................................... 416/223 R
See application file for complete search history.

(56) References Cited

FOREIGN PATENT DOCUMENTS

| WO | 2010129492 A2 | 11/2010 |
| WO | 2010133729 A1 | 11/2010 |
| WO | 2011035539 A1 | 3/2011 |

OTHER PUBLICATIONS

Danish Patent Office, Combined search and examination report issued in corresponding DK application No. PA 2011 70600 dated Dec. 15, 2012, 4 pages.

* cited by examiner

METHOD AND PRODUCTION FACILITY FOR MANUFACTURING A WIND TURBINE BLADE

FIELD OF THE INVENTION

The present invention relates to a method for manufacturing a wind turbine blade in a production facility. Furthermore, the invention relates to a production facility for manufacturing a wind turbine blade, and finally the invention relates to a wind turbine blade manufactured according to the method according to the present invention.

BACKGROUND ART

Wind turbines are increasing in size, causing their wind turbine blades to increase in size as well, both with respect to length and chord.

This poses challenges in the manufacturing of the blades, as moulds, handling units and tools are also to be enhanced in size, which is adding to the production costs as well as rendering the manufacture of wind turbine blades increasingly difficult.

Therefore, it is desirable to provide a flexible way of manufacturing wind turbine blades.

SUMMARY OF THE INVENTION

It is an object of the present invention to wholly or partly overcome the above disadvantages and drawbacks of the prior art. More specifically, it is an object to provide an improved method for manufacturing a wind turbine blade.

The above objects, together with numerous other objects, advantages, and features, which will become evident from the below description, are accomplished by a solution in accordance with the present invention by a method for manufacturing a wind turbine blade in a production facility, comprising the steps of positioning a first overhung gantry to extend transversely over an elongated first mould part for manufacturing one of a first part and a second part of the blade, performing a first working action at the first mould part with a first tool mounted on the first overhung gantry, moving the first overhung gantry from the first mould part to an elongated second mould part for manufacturing the other of the first and the second part of the blade, positioning the first overhung gantry to extend transversely over the second mould part, and performing a second working action at the second mould part by means of the first tool or a second tool mounted on the first overhung gantry.

Hereby, a flexible manufacturing method is provided, wherein a gantry may be moved from a first mould part to a second mould part (or vice versa) so that more gantries and thereby tools may be allocated to a specific mould part, which seen from a manufacturing point of view is desirable with a view to increasing the speed in some of the manufacturing steps. Furthermore, since the gantries are moveable between different mould parts, it is also possible to have fewer gantries, thus making investment related to the production facility less burdensome.

The first overhung gantry, when extending over the first mould part, may not extend over the second mould part, and vice versa.

In an embodiment, moving the first overhung gantry may comprise moving the first overhung gantry along the first mould part and past an extremity of the first mould part, and moving the first overhung gantry in a direction which is transverse to a longitudinal direction of the first mould part into a position from which it can be moved to extend transversely over the second mould part.

Moreover, the first overhung gantry may be movable along the first and the second mould parts on a pair of rails arranged on both sides of the first and second mould parts.

Also, a first pair of rails may be extending along the first mould part so that a rail is arranged on each side of the mould part and a second pair of rails may be extending along the second mould part so that a rail is arranged on each side of the mould part.

Further, one rail may be extending along and between the first and second mould parts, the one rail being comprised in both the first pair of rails and the second pair of rails.

Said rails may be arranged above the first and second mould parts.

Additionally, a second overhung gantry may be movable between the first and the second mould parts, and vice versa.

Furthermore, a plurality of overhung gantries may be movable between the first and the second mould parts, and vice versa.

Also, moving the first overhung gantry may comprise moving the first overhung gantry along the first mould part and past an extremity of the first mould part, and moving the first overhung gantry in a direction which is longitudinal to the first mould part into a position from which it can be moved to extend transversely over the second mould part.

In addition, moving the first overhung gantry may comprise moving the first overhung gantry along the first mould part to an end of the rails of the first mould part, transferring the first overhung gantry from the rails onto a transferring unit so that the first overhung gantry is disconnected from the rails of the first mould part, moving the transferring unit with the first overhung gantry into a position wherein the first overhung gantry is aligned with the rails of the second mould part, transferring the first overhung gantry from the transferring unit onto the rails of the second mould part, and moving the first overhung gantry into a position where it extends transversely over the second mould part.

Moreover, moving the first overhung gantry may comprise moving the first overhung gantry along the first mould part to an end of the rails of the first mould part, transferring the first overhung gantry from the rails onto an overhung transverse rail unit so that the first overhung gantry is disconnected from the rails of the first mould part, moving the first overhung gantry along the overhung transverse rail unit into a position wherein the first overhung gantry is aligned with the rails of the second mould part, transferring the first overhung gantry from the overhung transverse rail unit onto the rails of the second mould part, and moving the first overhung gantry into a position where it extends transversely over the second mould part.

In an embodiment, the first tool may be exchanged with a second tool either before or after it is moved from the first mould part to the second mould part.

Further, the first working action may be depositing material such as resin or gelcoat. The working action may also be prepreg layout.

The second working action may be different from the first working action.

Also, a plurality of gantries may be extending transversely over the first and/or second mould parts.

Furthermore, a second tool may be arranged on the first overhung gantry.

Additionally, a plurality of tools may be arranged on the first overhung gantry.

The tool may be a semi-automatic tool, a fully automatic tool, a robot, or a similar tool.

In an embodiment, a supply containing a consumer, such as resin or gelcoat, may be arranged on the first overhung gantry, the supply being connected to the first tool for supplying the consumer to the first tool during the working action.

Said the supply may be exchangeable so that other supplies may be connected to the tool in relation to the working action to be performed.

Moreover, the tool may be connected with a supply containing a consumer, the supply being positioned a distance from the gantry.

The first overhung gantry may be moved from the first mould part to another working station.

Also, the working station may be positioned decentrally from the first and second mould parts. The working station may for instance be a painting area placed away from the other working stations due to environmental requirements, or the working station may be a buffer area for storing gantries not in use.

In addition, moving of the first overhung gantry may involve the first overhung gantry being disconnected from one pair of rails before the first overhung gantry is connected to another pair of rails.

Furthermore, the first part and the second part of the blade may be a pressure side and a suction side of the blade, respectively.

In an embodiment, the first overhung gantry may comprise drive means.

The present invention further relates to a production facility for manufacturing a wind turbine blade, the production facility being adapted for carrying out the method according to any of the preceding claims, the production facility comprising
 a first overhung gantry positioned to extend transversely over an elongated first mould part for manufacturing one of a first part and a second part of the blade,
 a first tool mounted on the first overhung gantry for performing a first working action at the first mould part,
wherein a transfer unit is arranged for moving the first overhung gantry from the first mould part to an elongated second mould part for manufacturing the other of the first and the second part of the blade so that the first overhung gantry can be positioned to extend transversely over the second mould part, and so that a second working action at the second mould part by means of the first tool or a second tool mounted on the first overhung gantry can be performed.

Finally, the present invention relates to a wind turbine blade manufactured as described herein.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
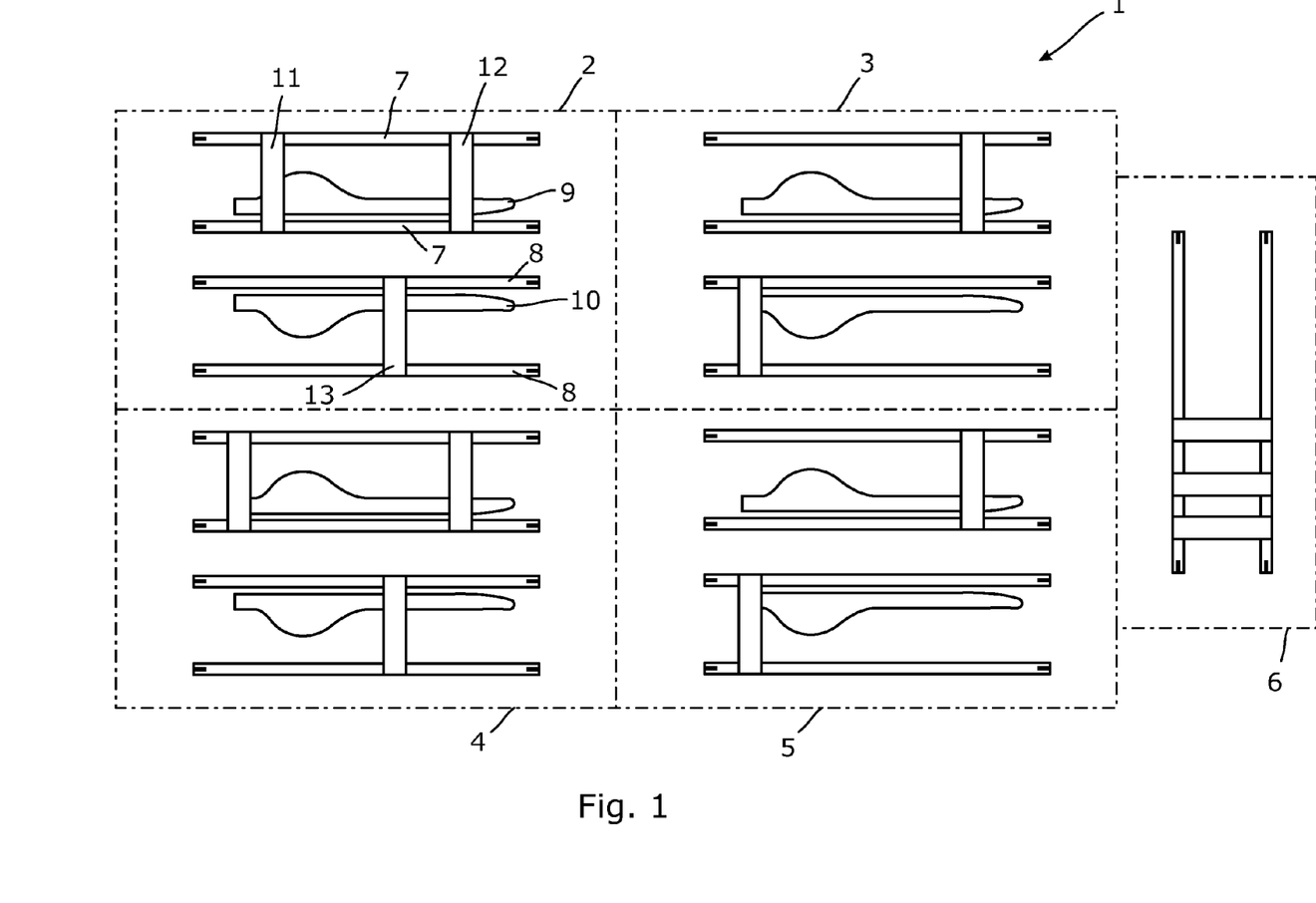
FIG. 1 shows schematically, in a top view, a production facility for manufacturing wind turbine blades.

In FIG. 1 a production facility 1 for manufacturing wind turbine blades is shown schematically in a top view. The production facility 1 comprises five working stations 2-6. The working stations 2-5 each comprises a first pair of rails 7 and a second pair of rails. For the sake of clarity, in the following only working station 2 will be described. However, the other working stations 3-5 may comprise the same elements as working station 2 even though they have not been indicated in the figures.

In working station 2, the first pair of rails 7 extends along an elongated first mould part 9 for manufacturing one of a first part and a second part of the blade (not shown). The second pair of rails 8 extends along an elongated second mould part 10 for manufacturing the other of the first and the second part of the blade (not shown).

A first overhung gantry 11 and a second overhung gantry 12 are extending transversely over the first mould part 9. A third overhung gantry 13 extends transversely over the second mould 10.

The gantries 11-13 comprise one or more tools (not shown) for performing working actions on the first and second mould parts for manufacturing one of the first part and second part of the blade.

In FIGS. 2 to 13, a sequence of moving the first overhung gantry 11 from the elongated first mould part 9 to the elongated second mould part 10 is shown.

Figure 2:
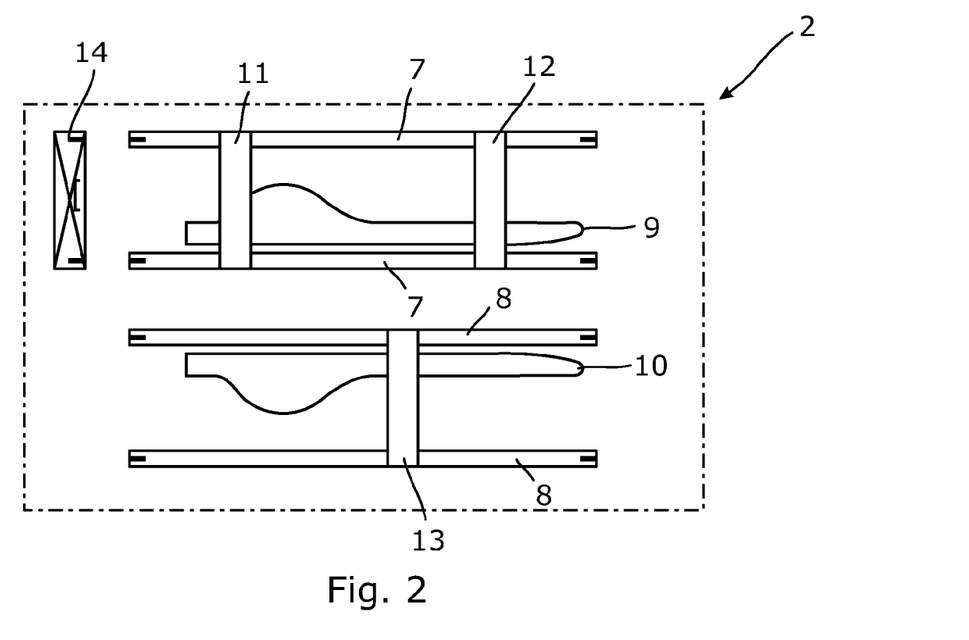
FIGS. 2 to 13 show, in a top view, a sequence of moving a first overhung gantry from an elongated first mould part to an elongated second mould part.

As described above in connection with FIG. 1, the working station 2 comprises the first pair of rails 7 extending along the first mould part 9 and the second pair of rails 8 extending along the second mould part 10. Furthermore, the first overhung gantry 11 and the second overhung gantry 12 are extending transversely over the first mould part 9 and the third overhung gantry 13 extends transversely over the second mould 10, as shown in FIG. 2.

Figure 3:
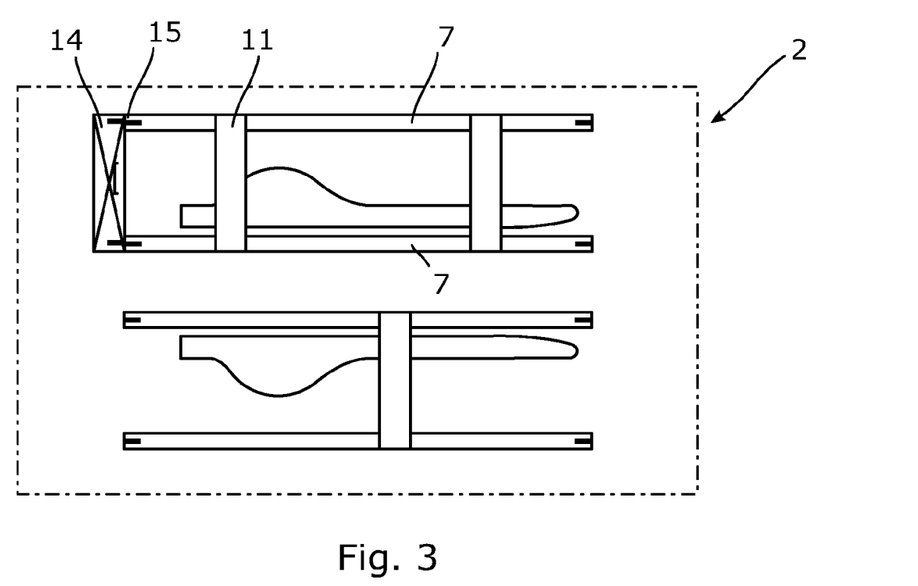
Figure 4:
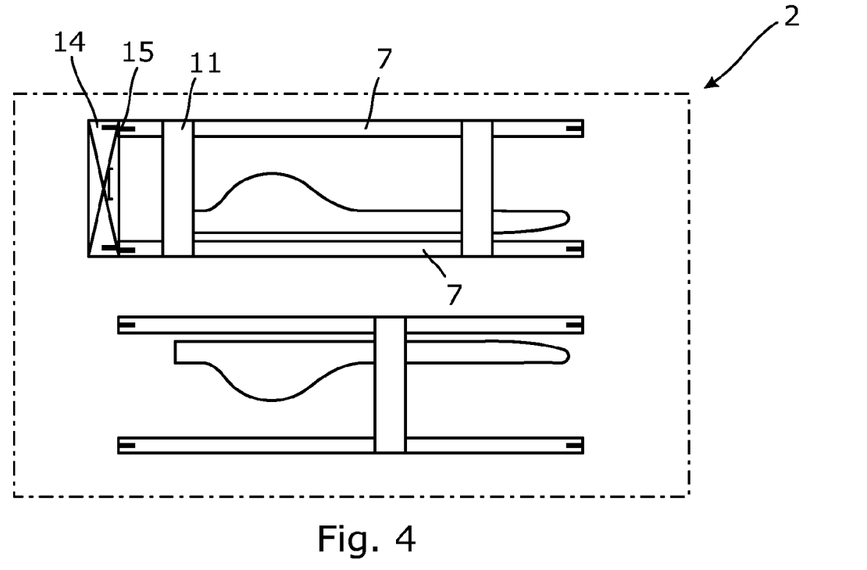

Furthermore, a transfer unit 14 is positioned in relation the first pair of rails 7. In FIG. 3, the transfer unit 14 has been aligned with the first pair of rails 7 by abutting the transfer unit 14 against the end 15 of the rails 7. The transfer unit 14 is then locked to the rails 7. Hereinafter, and as shown in FIG. 4, the first overhung gantry 11 is moved towards the end 15 of the rails 7 and past an extremity 16 of the first mould part 9. The extremity 16 could for instance be the root end or the tip end of the blade.

Figure 5:
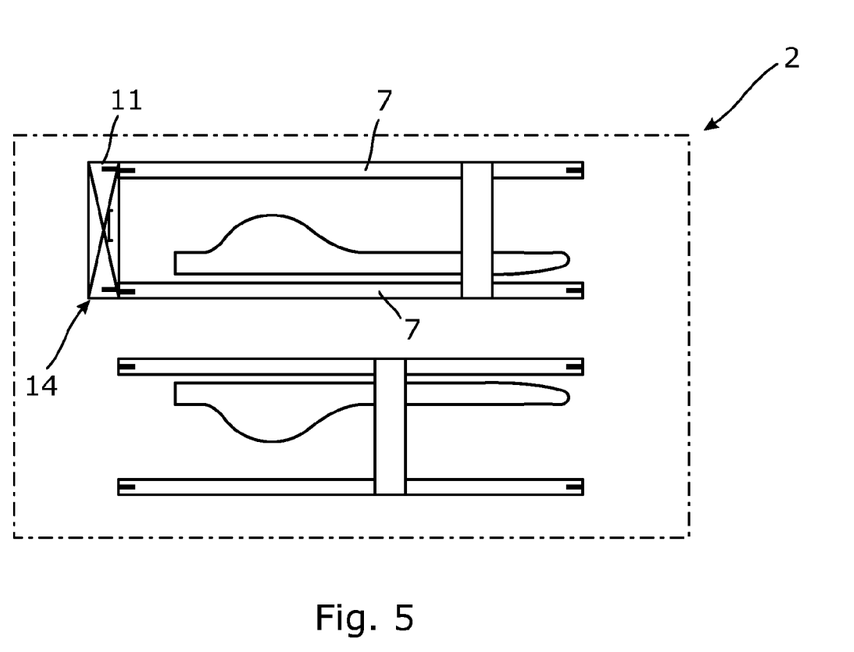
Figure 6:
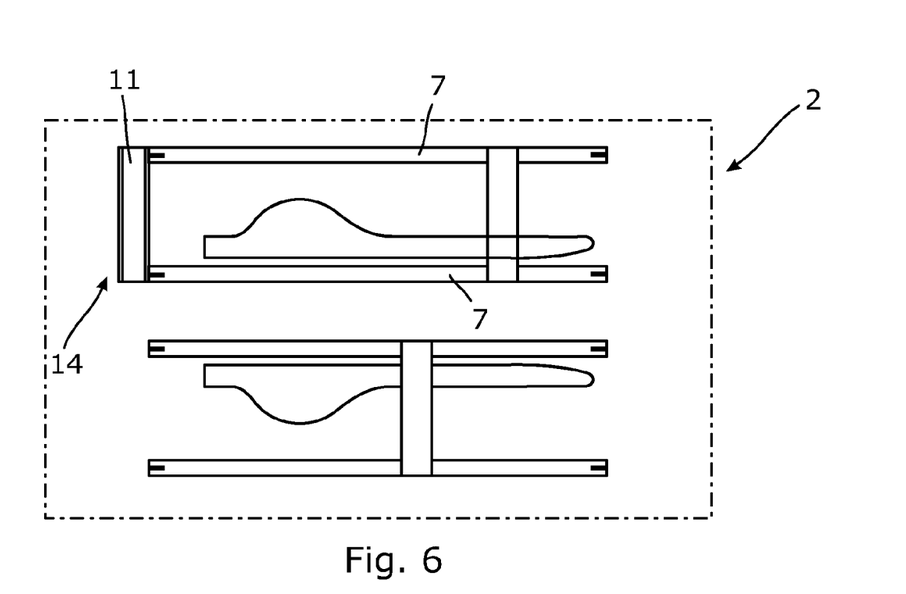
Figure 7:
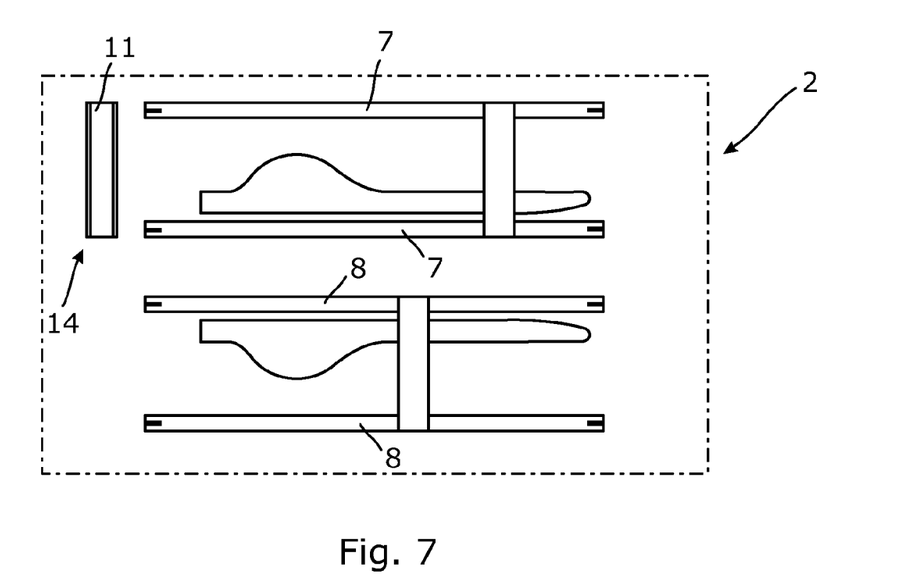
Figure 8:
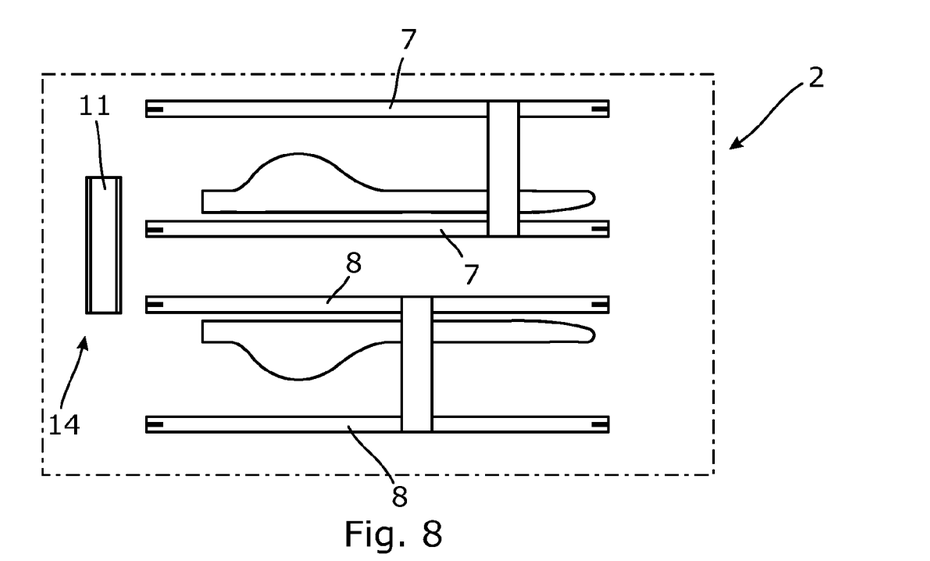
Figure 9:
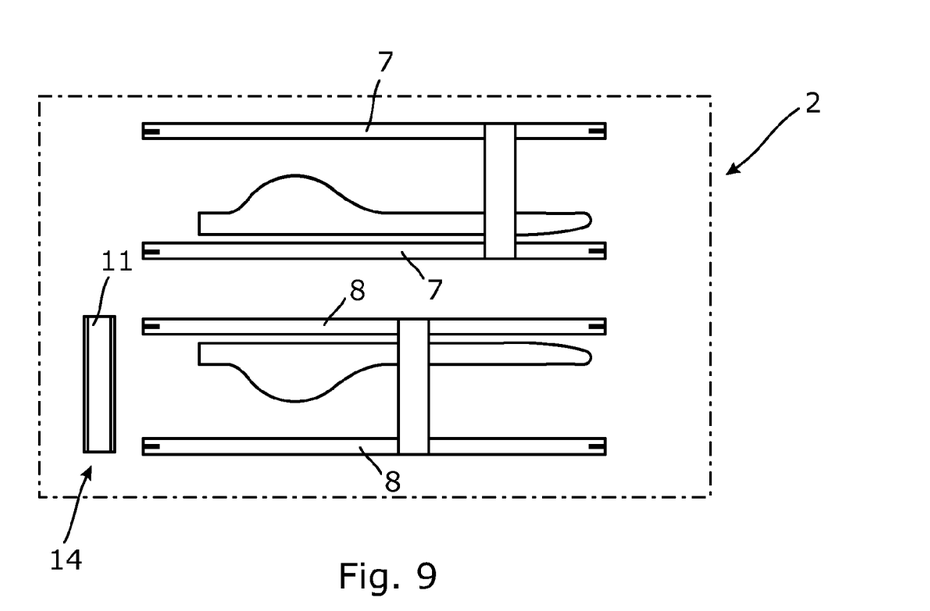
Figure 10:
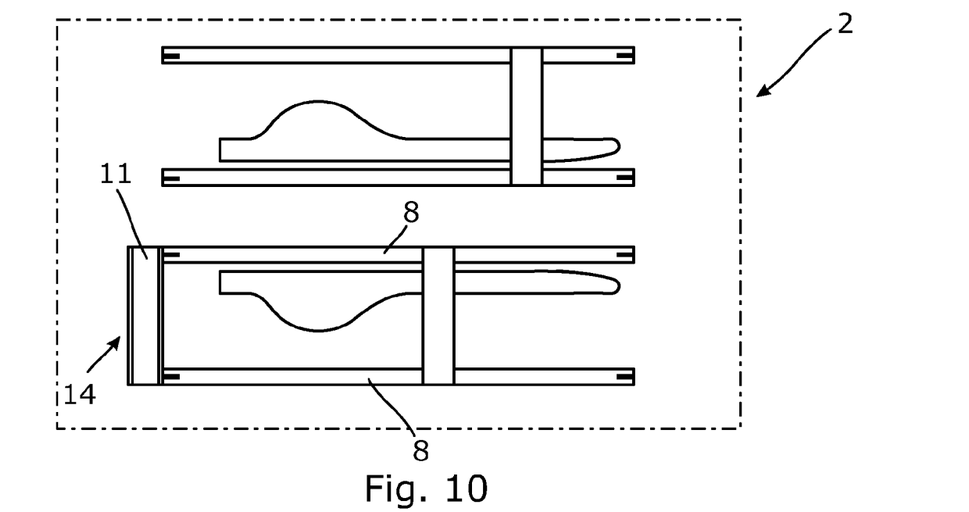
Figure 11:
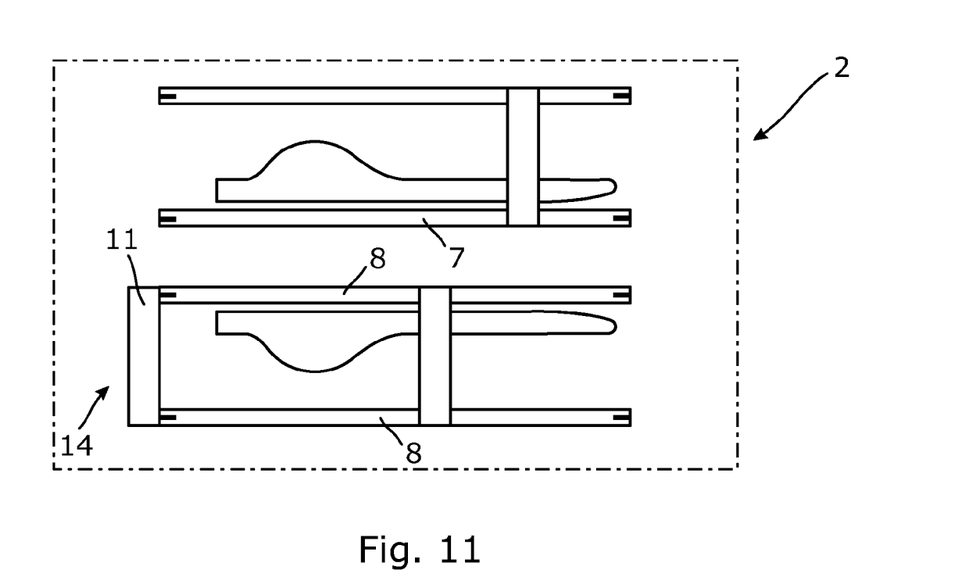

Then the first overhung gantry 11 is disconnected from the rails 7 and transferred to the transfer unit 14 as shown in FIG. 5. When the first overhung gantry 11 is securely connected to the transfer unit 14, the transfer unit 14 is unlocked from the rails 7 as shown in FIG. 6.

Figure 12:
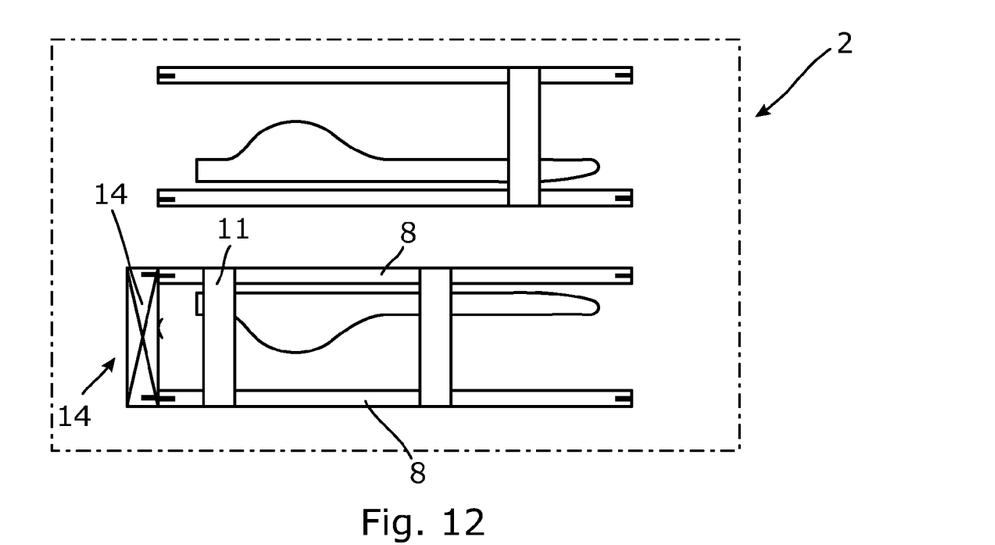
Figure 13:
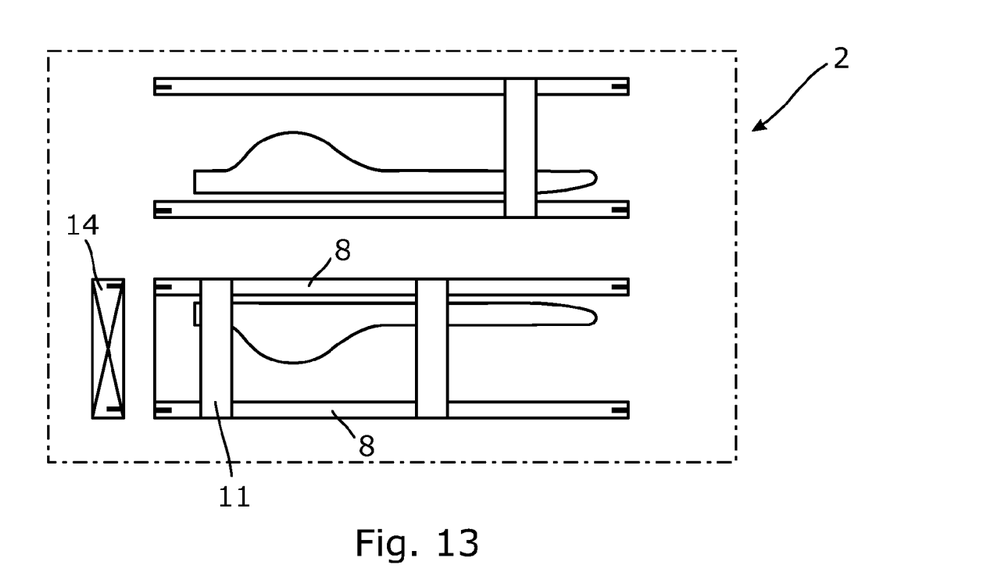

When the transfer unit 14 has been unlocked from the rails 7, the transfer unit 14 moves the first overhung gantry 11 to the second pair of rails 8 as shown in FIGS. 7-10. When the transfer unit 14 has been aligned to the end 17 of rails 8, the transfer unit is locked to the rails 8. Subsequently, the first overhung gantry 11 is released from its secure connection to the transfer unit 14 so that it may be disconnected from the transfer unit 14 and be moved onto the rails 8 as shown in FIG. 12. Hereinafter, the first overhung gantry 11 may be positioned to extend transversely over the second mould part 10 so that a second working action at the second mould part 10 may be performed by means of the first tool (not shown) or a second tool (not shown) mounted on the first overhung gantry 11. Finally, the transfer unit 14 is removed from the rails 8 as shown in FIG. 13, and the transfer unit 14 may then be applied to another working station in the production facility for moving another gantry.

Hereby, a flexible manufacturing method is provided, wherein the gantries may be moved from rails to rails so that more gantries and thereby tools may be allocated to mould parts, which—seen from a manufacturing point of view—is desirable with a view to increasing the speed in some of the manufacturing steps. Furthermore, since the gantries are moveable between different pairs of rails, it is also possible to have fewer gantries, thus making investment related to the production facility less burdensome.

In another not shown embodiment, moving the first overhung gantry comprises moving the first overhung gantry along the first mould part to an end of the rails of the first mould part, transferring the first overhung gantry from the rails onto an overhung transverse rail unit so that the first overhung gantry is disconnected from the rails of the first mould part, moving the first overhung gantry along the overhung transverse rail unit into a position wherein the first overhung gantry is aligned with the rails of the second mould part, transferring the first overhung gantry from the overhung transverse rail unit onto the rails of the second mould part, and moving the first overhung gantry into a position where it extends transversely over the second mould part.

The two embodiments described above for moving a gantry between two pairs of rails apply transverse movement of the gantry. In another not shown embodiment in which the gantry shall be moved between two pairs of rails being in succession of each other, the following method may be used. Moving the first overhung gantry comprises moving the first overhung gantry along the first mould part to an end of the rails of the first mould part, transferring the first overhung gantry from the rails onto a transferring unit so that the first overhung gantry is disconnected from the rails of the first mould part, moving the transferring unit with the first overhung gantry into a position wherein the first overhung gantry is aligned with the rails of the second mould part, transferring the first overhung gantry from the transferring unit onto the rails of the second mould part, and moving the first overhung gantry into a position where it extends transversely over the second mould part.

Figure 14:
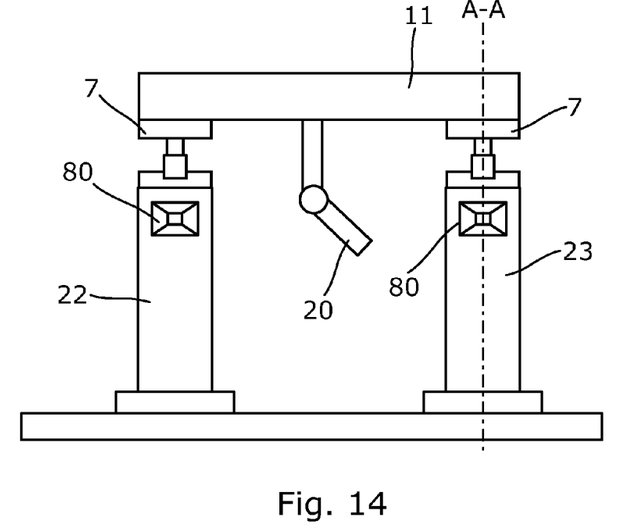
FIG. 14 shows schematically, in an end view, the first overhung gantry arranged on a pair of rails.
Figure 14A:
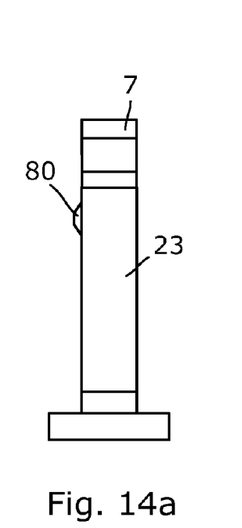
FIG. 14a shows a cross-sectional view of one of the pillars supporting the rails taken along the A-A line in FIG. 14.

In FIG. 14, the first overhung gantry 11 is shown in an end view arranged on a pair of rails 7. The first overhung gantry has a first tool 20 which extends downwards from a bottom side 21 of the first overhung gantry 11. In this embodiment, the rails 7 are supported by two support elements 22, 23, often referred to as pillars. At the end of the support elements 22, 23, first engagement mechanisms 80 are arranged. In this embodiment, the first engagement mechanisms 80 are projections which project from the support elements 22, 23. This is shown in the cross-sectional view of the support element 23 in FIG. 14a.

Figure 15:
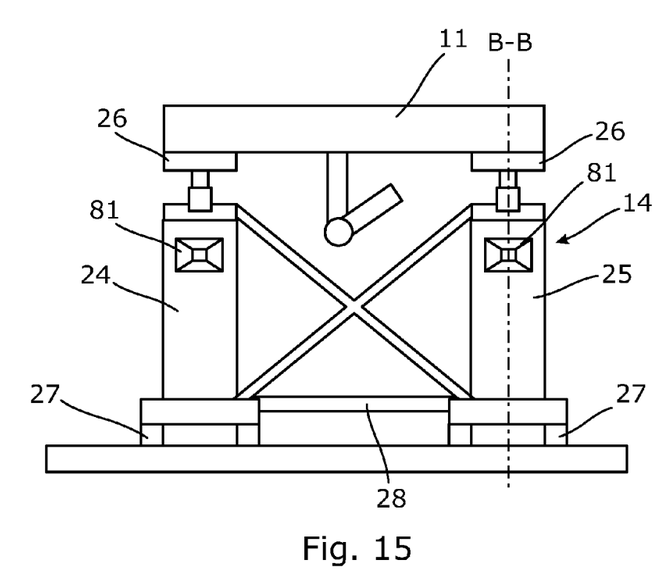
FIG. 15 shows schematically, in a side view, the first overhung gantry arranged on a transfer unit.

FIG. 15 shows schematically, in a side view, the first overhung gantry 11 arranged on the transfer unit 14 as described in connection with FIGS. 2 to 13 above. The transfer unit 14 comprises two support structures 24, 25 (or pillars) adapted to support two short rails 26 upon which the gantry 11 rests during the movement. Each support structure 24, 25 is placed on a motion mechanism 27, such as wheels, so that the transfer unit 14 is moveable. A further structure 28 is arranged between the two support structures for strengthening and providing stability to the transfer unit 14.

Figure 15A:
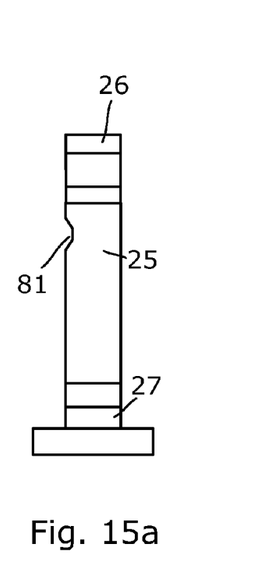
FIG. 15a shows a cross-sectional view of one of the pillars of the transfer unit taken along the B-B line in FIG. 15.

As described in connection with the support elements 22, 23 in FIG. 14, the support structures 24, 25 comprise second engagement mechanisms 81 corresponding to the first engagement mechanisms 80, so that the first and second engagement mechanisms may engage each other mechanically when the transfer unit 14 abuts the end of the pair of rails 7 shown in FIG. 14, and thereby align and lock the transfer unit 14 to the pair of rails 7 so that transfer of the gantry 11 from the pair of rails 7 to the transfer unit 14 is facilitated. In this embodiment, the second engagement mechanisms 81 are recesses arranged in the support structures 24, 25. This is shown in the cross-sectional view of the support structure 25 in FIG. 15a.

Thus, the transfer unit 14 can be engaged by the use of the engagement mechanisms 80, 81 arranged at the ends of the pair of rails and on the transfer unit 14 so the rails 26 on the transfer unit 14 become an extension of the rails 7. Once the transfer unit 14 is engaged, the gantry 11 can be transferred to it. Once the gantry 11 has been placed on the transfer unit 14, any further movement of the gantry 11 on the transfer unit 14 would be prevented by the use of a locking system (not shown). Once the gantry has been locked, the transfer unit 14 can be disengaged from the rails 7 and then guided (driven) to the required location.

In another not shown embodiment, the engagement mechanisms may be replaced by sensors arranged on the transfer unit and the rails for aligning the transfer unit to the rails during the transfer of the gantry.

Furthermore, in order to be able to close the moulds, gantries would need to be able to withdraw from the closing mould path. To be able to achieve this on a working station without this transfer, rails needs to be extended by at least (width of the gantry multiplied by the numbers of gantries) at each end of the mould part.

This makes a total of (width of the gantry multiplied by the numbers of gantries) multiplied by 2 (Tip and Root ends) multiplied by 2 (rail system per working stations) multiplied by (number of working stations in the production facility) m2.

For a typical configuration consisting of gantries having a width of 24 meters with a depth of 2 meters per gantry, figures come as follows (Note: One working station (2 rail systems with capacity for 4 gantries on each rail system)):

One working station: 960 m2
Two working stations: 1920 m2
Three working stations: 2880 m2
Four working stations: 3840 m2

For a system using the present inventive concept, the following equations may be applied (width of a gantry [w]) multiplied by (length to store all the required gantries as a buffer) for instance working station 6 in FIG. 1 m2.

For the same typical configuration as mentioned above, the total area of the production facility would be:
One working station: 384 m2
Two working stations: 768 m2
Three working stations: 1152 m2
Four working stations: 1536 m2

Thus, by applying the present inventive concept, the production facility may occupy less space with the same capacity which again makes the production facilities for blade manufacturing less investment heavy.

Figure 16:
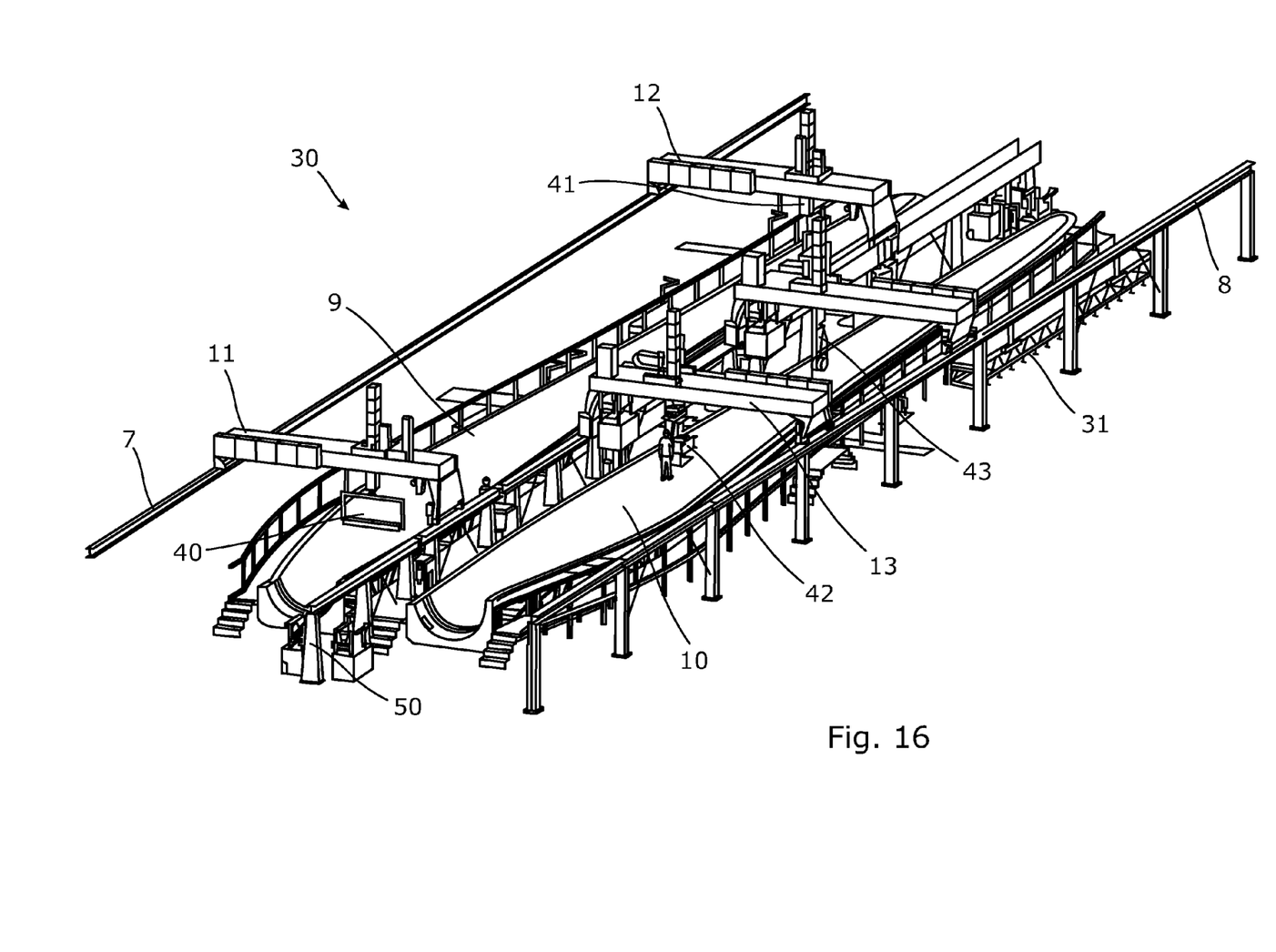
FIG. 16 shows another embodiment of a working station for manufacturing a wind turbine blade.

FIG. 16 shows another embodiment of a working station 30 for manufacturing a wind turbine blade (not shown). In this embodiment, the working station 30 comprises an elongated first mould part 9 and an elongated second mould part 10. Two overhung gantries 11, 12 extend transversely over the first mould part 9 and two overhung gantries 13, 31 extend transversely over the second mould part 10. According to the inventive idea, the gantries 11, 12, 13, 31 may be moved from one mould part to the other. Each gantry 11, 12, 13, 31 has a tool 41-43 arranged below the gantry for performing working actions on the mould parts 9, 10 for manufacturing the blade parts.

The tools 41-43 may be the same tools performing the same working action or they may be different performing different working actions as shown in FIG. 16. In this embodiment, the gantries 11, 12, 13, 31 are supported by three rails. The first rail 7 extends along the first mould part 9 on the opposite side of the side facing the second mould part 10. In the same manner, the second rail 8 extends along the second mould part 10 on the opposite side of the side facing the first mould part 9. The third rail 50 is arranged between the first mould part 9 and the second mould part 10. Thus, in this embodiment, the gantries over each mould part are supported by the same rail 50.

Figure 17:
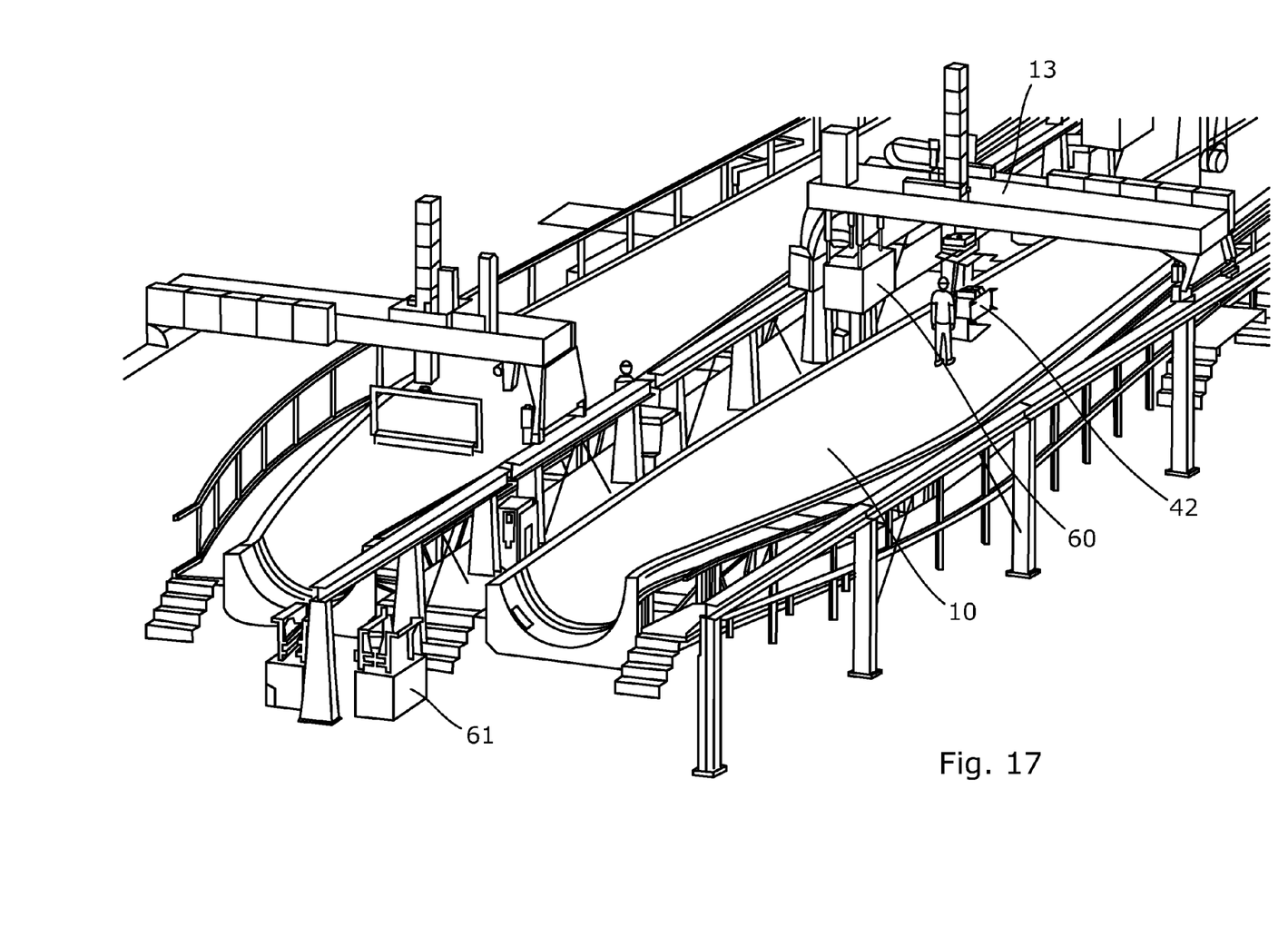
FIG. 17 shows an enlarged part view of the working station of FIG. 16.

FIG. 17 shows an enlarged part view of the working station 30 of FIG. 16. A supply 60 containing a consumer, such as resin or gelcoat, may be arranged on the gantry 13, the supply being connected to the tool 42 for supplying the consumer to the tool 42 during the working action. The supply may be exchangeable so that other consumers may be connected to the tool 42 in relation to the working action to be performed. In FIG. 17, additional supply 61 is stored past the extremity of the second mould part 10 so that the gantry 13 may be moved to a position above the additional supply 61 whereby the supply may be exchanged.

In another not shown embodiment the tool may be connected with a supply containing a consumer, the supply being positioned a distance from the gantry.

Figure 18:
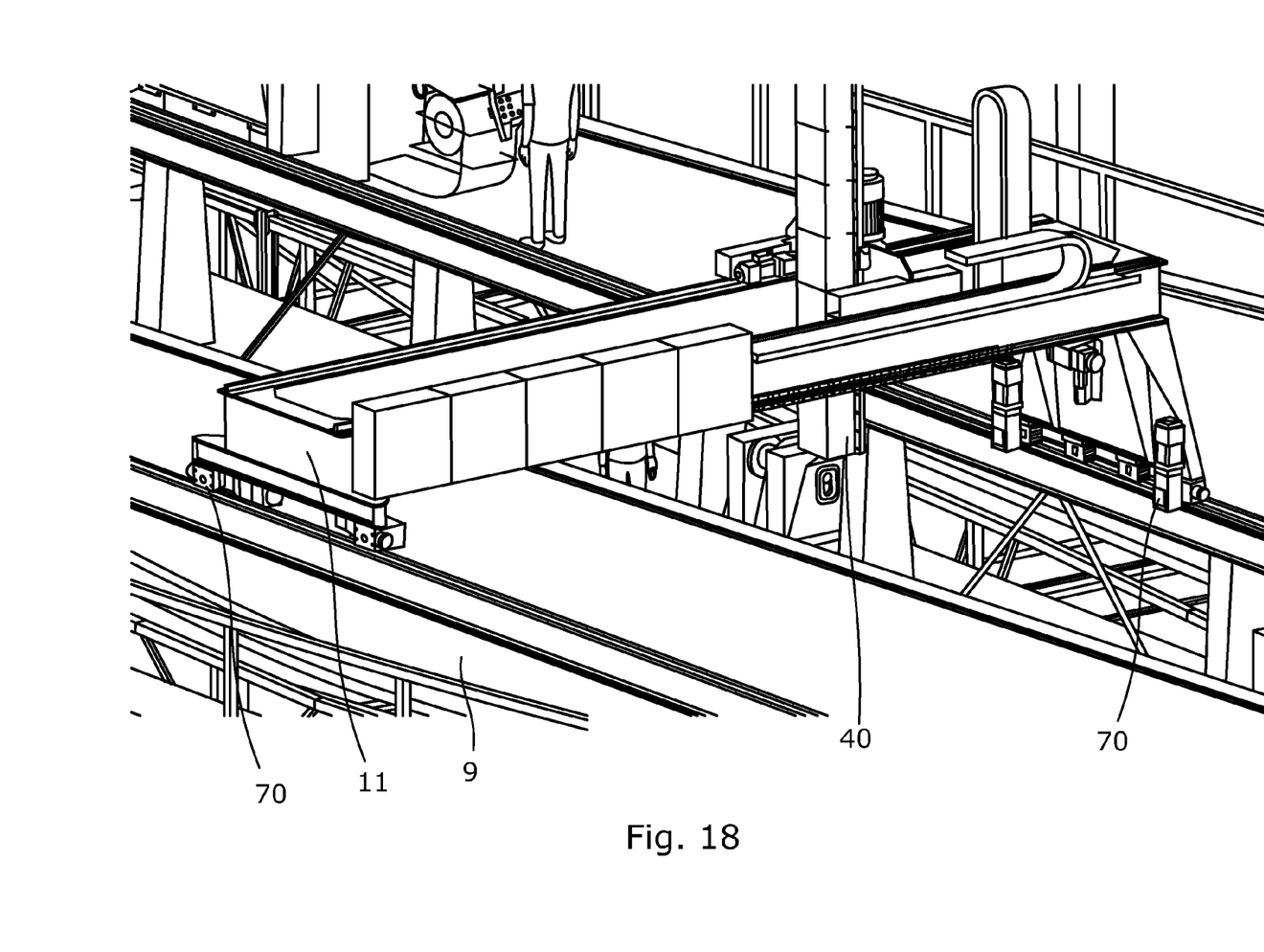
FIG. 18 shows an enlarged view of the first overhung gantry.

FIG. 18 also shows an enlarged view of the first overhung gantry 11. The gantry 11 comprises drive means 70 so that it may be moved along the rails. Furthermore, the tool 40 may be moved in a transverse direction of the gantry whereby the tool 40 is capable of working in the entire width of the mould part 9. Also, the tool 40 may be movable in a vertical direction.

The gantries have been shown with one tool arranged on each gantry. However, in other not shown embodiments, two or more tools may be arranged on a gantry.

Although the invention has been described in the above in connection with preferred embodiments of the invention, it will be evident for a person skilled in the art that several modifications are conceivable without departing from the invention as defined by the following claims.

The invention claimed is:

1. A method for manufacturing a wind turbine blade in a production facility, comprising the steps of:
positioning a first overhung gantry to extend transversely over an elongated first mould part for manufacturing one of a first part and a second part of the blade,
after positioning the first overhung gantry, moving the first overhung gantry in a first direction to perform a first working action at the first mould part with a first tool mounted on the first overhung gantry,
moving the first overhung gantry from the first mould part to an elongated second mould part for manufacturing the other of the first and the second part of the blade through movement of the first overhung gantry in a second direction transverse to the first direction,
positioning the first overhung gantry to extend transversely over the second mould part, and
performing a second working action at the second mould part by means of the first tool or a second tool mounted on the first overhung gantry.

2. The method according to claim 1, wherein the first overhung gantry, when extending over the first mould part, does not extend over the second mould part, and vice versa.

3. The method according to claim 1, wherein moving the first overhung gantry comprises:
moving the first overhung gantry along the first mould part and past an extremity of the first mould part, and
moving the first overhung gantry in a direction which is transverse to a longitudinal direction of the first mould part into a position from which it can be moved to extend transversely over the second mould part.

4. The method according to claim 1, wherein the first overhung gantry is movable along the first and the second mould parts on a pair of rails arranged on both sides of the first and second mould parts.

5. The method according to claim 4, wherein moving the first overhung gantry comprises:
moving the first overhung gantry along the first mould part to an end of the rails of the first mould part,
transferring the first overhung gantry from the rails onto a transferring unit so that the first overhung gantry is disconnected from the rails of the first mould part,
moving the transferring unit with the first overhung gantry into a position wherein the first overhung gantry is aligned with the rails of the second mould part,
transferring the first overhung gantry from the transferring unit onto the rails of the second mould part, and
moving the first overhung gantry into a position where it extends transversely over the second mould part.

6. The method according to claim 4, wherein moving the first overhung gantry comprises:
moving the first overhung gantry along the first mould part to an end of the rails of the first mould part,
transferring the first overhung gantry from the rails onto an overhung transverse rail unit so that the first overhung gantry is disconnected from the rails of the first mould part,
moving the first overhung gantry along the overhung transverse rail unit into a position wherein the first overhung gantry is aligned with the rails of the second mould part,
transferring the first overhung gantry from the overhung transverse rail unit onto the rails of the second mould part, and
moving the first overhung gantry into a position where it extends transversely over the second mould part.

7. The method according to claim 1, wherein a second overhung gantry is movable between the first and the second mould parts, and vice versa.

8. The method according to claim 1, wherein a plurality of overhung gantries are movable between the first and the second mould parts, and vice versa.

9. The method according to claim 1, wherein the first tool is exchanged with the second tool either before or after it is moved from the first mould part to the second mould part.

10. The method according to claim 1, wherein the first working action is depositing material.

11. The method according to claim 10, wherein the first working action is depositing a resin or gelcoat.

12. The method according to claim 1, wherein the second working action is different from the first working action.

13. The method according to claim 1, wherein the first direction is substantially parallel to a longitudinal direction of the first mould part.

14. The method according to claim 1, wherein positioning the first overhung gantry to extend transversely over the elongated first mould part further comprises positioning the first overhung gantry on a first pair of rails on opposite sides of the first mould part, and wherein positioning the first overhung gantry to extend transversely over the elongated second mould part further comprises positioning the first overhung gantry on a second pair of rails on opposite sides of the second mould part.

15. The method according to claim 14, wherein the first and second pairs of rails are not in axial alignment.

* * * * *